United States Patent Office 3,758,474
Patented Sept. 11, 1973

3,758,474
PROCESS FOR THE PRODUCTION OF 2-ARYL-3-IMINO-s-TRIAZOLO-[4,3-α] - 5 - METHYL-7-HYDROXY-PYRIMIDINES
Erik Herkenrath, Litterna, Visp, Switzerland, assignor to Lonza Ltd., Gampel/Valais (Direction), Basel, Switzerland
No Drawing. Filed Jan. 22, 1971, Ser. No. 108,949
Claims priority, application Switzerland, Jan. 27, 1970, 1,084
Int. Cl. C07d 51/46
U.S. Cl. 260—256.4 F    5 Claims

ABSTRACT OF THE DISCLOSURE

Process for the preparation of 2-aryl-3-imino-s-triazolo-[4,3-α]-5-methyl-7-hydroxy pyrimidines by reaction of diketene with 3,5-diamino-1-aryl-1,2,4-triazoles, which may be formed by reaction of an aryl hydrazine and dicyano-diamide. The compounds are useful in the photographic arts as fog inhibitors.

BACKGROUND OF INVENTION

Antifoggants are compounds which can be added to the emulsions or the developers utilized in the photographic arts to restrain the production of fogs.

While a number of such products are known and have been described, none are totally satisfactory in all respects. Accordingly, considerable time and efforts have been expended in efforts to find new ones.

THE INVENTION

Novel fog inhibitors which can be utilized both in the emulsion and in the developer have now been discovered. They are 2-aryl-3-imino-s-triazolo-[4,3-α]-5-methyl-7-hydroxy pyrimidines. This invention relates to such compounds and to their method of production.

The compounds may be represented by the general formula

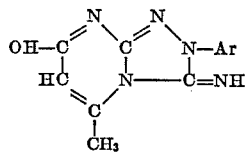

in which Ar represents aromatic radicals such as phenyl which can be substituted by an alkyl group, preferably an alkyl group with 1 to 6 C-atoms. The products are prepared by reaction of diketene with 3,5-diamino-1- aryl-1,2,4-triazoles. The latter compounds may be prepared by reacting dicyano-diamide with an aryl hydrazine. The reaction preferably takes place in aqueous solution by reaction of the dicyano-diamide with a mineral acid salt of the hydrazine derivative. The triazole is obtained in aqueous solution and, in preferred modifications of the invention is reacted wtih the diketene directly and without isolation.

In the presently preferred process for the preparation of the pyrimidines the triazole is reacted with diketene in a reaction inert polar solvent at a temperature of from about 20° C. to 70° C. If the triazole is not isolated, the water in which it is formed will serve as the solvent. If it is isolated, alcohols and other polar organic liquids such as acetonitrile, acetic ester and lower carboxylic acids such as acetic acid and propionic acid may be employed.

Catalytic quantities of strong organic acids such as acetic acid may be advantageously employed. For optimum results it is preferred to use a molar excess of diketene. Typically from about 1.5 to 2.5 mols of diketene is employed for each mol of triazole.

The novel compounds of the present invention are useful as both developer and emulsion fog inhibitors and as stabilizers for emulsions.

The following non-limiting examples are given by way of illustration only.

Example 1

17.5 g. of 3,5-diamino-1-phenyl-1,2,4-triazole dissolved in 100 ml. ethanol and 3 ml. glacial acetic acid were heated to 30° C. with stirring in a reaction flask having a capacity of 250 ml. and is fitted with stirrer, thermometer and a reflux condenser with a dropping funnel. 17.6 g. of diketene were subsequently added dropwise. The temperature rose to 45° C. The mixture was cooled to 20° C. after one hour, the crystals were separated, washed and dried in a vacuum at about 70° C. There resulted 19 g. of crude product corresponding to a yield of 76%, based on the triazole. The crude product was recrystallized from methanol. The melting point was 182 to 183° C.

The structure was established by IR- and NMR-spectrum analysis.

Calculated (percent): C, 59.7; H, 4.6; N, 29.0. Found (percent): C, 59.0; H, 4.7; N, 28.6.

Example 2

500 ml. of an aqueous phenyl-hydrazine-sulphate solution (3%) and 25 g. dicyano-diamide were introduced into a reaction vessel (750 ml. capacity) fitted with stirrer, thermometer, dropping funnel and reflux condenser, and heated with stirring to reflux temperature. This temperature was maintained for 5 hours. The temperature was subsequently reduced to 45° C. and 26.2 g. diketene were added in the course of 15 minutes. The pyrimidine started to crystallize. After 2 hours, the mixture was cooled to 20° C., filtered and the crude product was dried in a vacuum at 70° C. There resulted 24 g. of crude product corresponding to a yield of 77%, based on phenyl-hydrazine. The melting point of the product after recrystallization from ethanol was 182° C.

Calculated (percent): C, 59.7; H, 4.6; N, 29.0. Found (percent): C, 59.0; H, 4.5; N, 28.8.

The IR and NMR spectra were identical with those of Example 1.

Example 3

1810 ml. of an aqueous tolyl-hydrazine-sulfate solution (1.4%) and 50 g. dicyano-diamide were introduced into a reaction vessel as used in Example 2 and heated with stirring to reflux temperature. This temperature was maintained for 8 hours. The temperature was then reduced to 50° C. and 52.4 g. diketene were added in the course of 15 minutes. The pyrimidine started to crystallize. After 2 hours the mixture was cooled to 20° C., filtered and the crude product was dried in vacuum at 70° C. The yield of the desired product, 2-para-methylphenyl-3-imino-3-triazolo-[3,4-α]-5-methyl - 7 - hydroxypyrimidine was 60% based on tolyl-hydrazine. The melting point of the product after recrystallization from isopropanol, and water (2:1) was 199.7° C.

The structure was established by UV-, IR- and NMR-spectrum analysis.

Calculated (percent): C, 61.2; H, 5.1; N, 27.4. Found (percent): C, 60.8; H, 5.2; N, 27.5.

What is claimed is:

1. Process for the production of 2-aryl-3-imino-s-triazolo-[4,3 - α] - 5 - methyl-7-hydroxypyrimidines of the formula

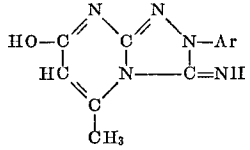

in which Ar denotes phenyl or alkyl substituted phenyl wherein an alkyl group contains 1 to 6 carbon atoms by reaction of a 3,5-diamino-1-Ar-1,2,4-triazole with diketene in a reaction inert polar solvent at a temperature of from 20° C. to 70° C.

2. Process according to claim 1 carried out in the presence of catalytic amounts of acetic acid.

3. A compound of the formula

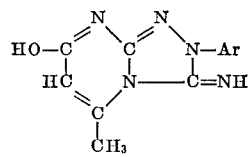

in which Ar is phenyl or alkyl substituted phenyl wherein an alkyl group contains 1 to 6 carbon atoms.

4. A product of claim 3 in which Ar is phenyl.

5. A product of claim 3 in which the phenyl radical is substituted with a lower alkyl group containing from 1 to 6 carbon atoms.

References Cited
UNITED STATES PATENTS
3,271,401   9/1966   Williams _____ 260—256.4

ALEX MAZEL, Primary Examiner

R. V. RUSH, Assistant Examiner

U.S. Cl. X.R.

96—109; 252—357; 260—308 R